United States Patent
Buchanan et al.

(10) Patent No.: US 6,966,548 B2
(45) Date of Patent: Nov. 22, 2005

(54) VAPOR/LIQUID CONTACTING CYCLONE WITH SECONDARY VANES

(75) Inventors: John Scott Buchanan, Lambertville, NJ (US); Berne K. Stober, Gainesville, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 90 days.

(21) Appl. No.: 10/611,039

(22) Filed: Jul. 1, 2003

(65) Prior Publication Data

US 2004/0104493 A1 Jun. 3, 2004

Related U.S. Application Data

(62) Division of application No. 09/107,787, filed on Jun. 30, 1998, now abandoned.
(60) Provisional application No. 60/065,498, filed on Nov. 19, 1997.

(51) Int. Cl.$^7$ .................................................. B01F 3/04
(52) U.S. Cl. .................................... 261/79.2; 261/114.3
(58) Field of Search .............................. 261/79.2, 114.1, 261/114.3; 55/347, 348, 452, 456, 457, 458; 95/185, 219, 261, 269; 96/181, 191, 208, 215; 202/158

(56) References Cited

U.S. PATENT DOCUMENTS

| | | | | |
|---|---|---|---|---|
| 4,752,307 A | * | 6/1988 | Asmus et al. | 95/213 |
| 4,755,198 A | * | 7/1988 | Darton | 96/301 |
| 4,838,906 A | * | 6/1989 | Kiselev | 96/306 |
| 4,908,051 A | * | 3/1990 | Kiselev | 55/457 |
| 5,626,799 A | * | 5/1997 | Sheinman | 261/79.2 |
| 6,105,941 A | * | 8/2000 | Buchanan et al. | 261/79.2 |
| 6,221,133 B1 | * | 4/2001 | Moore | 95/199 |

* cited by examiner

Primary Examiner—Scott Bushey

(57) ABSTRACT

This invention is directed to a cyclonic vapor/liquid contacting device and distillation or related mass transfer or heat transfer processes employing its use, such as fluid catalytic cracking. Liquid feed is introduced near the floor of the cyclone via downcomer or plenum. Vapor enters through sieve holes in the bottom of the cyclonic device. Near the floor are angled tabs or vanes that impart a spin to the vapor rising up through the floor. The tabs or vanes mix the liquid and vapor. The liquid is then thrown toward the cyclone wall, where it exits through slots in the wall. A second set of tabs or vanes, located about in the middle of the cyclone, imparts additional spin to the vapor and entrained liquid rising through the cyclone. This improves liquid collection by the cyclone, especially in cases where a heavy liquid load dampens the spin action of the vapor in the base of the cyclone. In another embodiment, there is a non-spinning zone at the floor of the cyclone barrel which permits improved heat transfer between the liquid and vapor. If a non-spinning zone is used, the two sets of vanes or tabs are located at higher elevations within the barrel.

6 Claims, 5 Drawing Sheets

Figure 1 - Prior Art

VAPOR/LIQUID CONTACTING CYCLONE WITH SECONDARY VANES

CROSS-REFERENCE TO RELATED APPLICATIONS

This application is a Divisional application of Ser. No. 09/107,787, filed Jun. 30, 1998, now abandoned, which claims domestic priority to Provisional application 60/065,498, filed Nov. 19, 1997, now abandoned.

FIELD OF THE INVENTION

This invention is directed to a cyclonic vapor/liquid contacting device and the process of employing it in distillation or related mass transfer or heat transfer applications, such as fluid catalytic cracking. This invention is directed to the use of secondary vanes placed in the cyclone at a point above the level of initial liquid removal as well as to an area at the base of the cyclone where spin is minimized.

BACKGROUND OF THE INVENTION

Cyclone separators are well-known devices for separating solids from gases and gases from liquids. Some typical cyclone separator designs are illustrated in Perry's Chemical Engineers' Handbook, published by McGraw-Hill Book Company, New York City.

The use of vanes within cyclones is well-known. They are used to guide the flow of gases and minimize entrainment of liquids or solids. U.S. Pat No. 3,969,096 (Richard) discloses a cyclone separator having multiple vaned gas inlets. The gas inlet consists of elongated inlet openings (like those of a louver) positioned to deflect incoming gas in a circular path from the gas outlet tube.

U.S. Pat. No. 3,707,830 (Gustavsson) discloses a cyclone separator having a cylindrical shell with a conical converging inlet portion. A ring of guide vanes is positioned within the outlet to impart a rotational flow to the entering gas. The ring is axially moveable.

U.S. Pat. No. 5,683,493 (Stober) discloses close packed cyclones similar to those depicted in one embodiment of the instant invention. In the preferred embodiment, however, vapor and entrained liquid are directed upward in a rotational fashion by tabs in the base of the cyclone. The instant invention discloses close-packed cyclones in which one embodiment does not possess a spinning zone at its base.

FIG. 1 shows a cyclonic device for vapor/liquid contacting in which liquid is introduced near the floor of the cyclone. The barrel is drawn with dashed lines, to distinguish it from the other parts of the device. Preferably, liquid is introduced through a downcomer tube located axially in the cyclone barrel, as shown in FIG. 1. Alternately, it may be introduced through a plenum, which is fed by a downcomer from the tray above (this embodiment is not depicted).

As vapor rises through the base of the cyclone, it passes through orifices which impart a spin to the vapor. As patents such as U.S. Pat. No. 3,969,096 demonstrate, the concept of devices, such as vanes, to impart spin located at the inlet of the cyclone is known. Preferably, these vanes are formed integrally with holes in the base of the cyclone. The gas then imparts a rotational action to the liquid. The liquid is preferentially thrown to the outside of the cyclone. Openings in the barrel of the cyclone allow the liquid to exit from the cyclone. Flaps or baffles in or near these openings may be used to help direct liquid out through the openings. An annular hat above the barrel may also be used to capture liquid emerging from the top of the barrel and to direct this liquid downward. If the conventional device depicted in FIG. 1 is used, the liquid can dampen the spin action of the vapor. This reduces the liquid collection efficiency in the cyclone.

U.S. Pat. No. 3,498,028 (Trouw) illustrates a vessel for contacting liquid and vapor when a large supply of liquid must be accommodated. Liquid is added at the base of the vessel through a horizontal tube extending inward toward the center. Vapor rises into the vessel vertically. Vapor and liquid mix at the base of the vessel, and vapor rises with entrained liquid.

G.B. 1,070,777, assigned to Shell International Research, illustrates a tray for mounting in a column for liquid/gas contacting which possesses at least one tubular liquid/gas contacting device, which is located at the base of the column. In U.S. Pat. No. 5,683,629, the liquid delivery device first disclosed in G.B. 1,070,777 further comprises a plurality of parallel channels having upwardly directed openings. This increases the entrainment of liquid in the gas, thereby improving heat transfer.

In conventional cyclones, spin is imparted to the vapor and entrained liquid after it enters the cyclone via a downcomer or plenum. The vapor and entrained liquid then moves upward, entering a zone where liquid is removed via slots or other perforations in the barrel or by an annular hat in the top of the barrel.

SUMMARY OF THE INVENTION

The instant invention, a cyclone having at least two sets of spin imparting elements, (such as vanes) and the process of liquid and vapor separation occurring in the cyclone is illustrated in FIG. 2. Placing secondary spin vanes, as shown in FIG. 2, in the cyclone some distance above the base of the cyclone, imparts additional spin to the vapor, which helps the liquid collection efficiency of the cyclone. This reduces the amount of liquid carried upwards and out of the cyclone with the vapor. This type of liquid entrainment is usually undesirable in a fractionation device, since it can reduce fractionation efficiency and lead to flooding of a distillation column. A zone may be located at the base of the cyclone in which spin is minimized.

In the instant invention, at least some liquid removal begins below the final (uppermost) spin-imparting element Preferably these elements are two distinct sets of spin vanes, with exit slots in the cyclone barrel starting below the upper set of spin vanes. After entering the cyclone via a downcomer or plenum, vapor and entrained liquid preferably enter a zone at the base of the cyclone where there are no vanes or other devices to impart spin. The vapor and entrained liquid move upward through the cyclone, encountering spin vanes which direct some of the entrained liquid to the walls of the barrel, where it is removed via slots. The vapor and the remainder of entrained liquid then encounter a second set of spin vanes, which impart spin to the entrained liquid so that it can be effectively removed via perforations such as slots or holes in the sides of the barrel or through annular hats at the top of the cyclone.

There may be overlap between the initial zone for liquid removal and the second set of spin vanes.

As liquid exits the barrel of this device, it may have appreciable upwards velocity, which can interfere with the desired liquid collection. Placing means outside the cyclone to break the upward momentum can therefore aid in liquid collection. A variety of vanes or baffles may serve as this means. Fabrication can be simplified by forming these vanes integrally from the barrel material as opposed to fastening additional devices to the barrel. FIG. 3 shows a preferred means, which is a plurality of capping vanes. These capping vanes may be placed along the top of an exit hole, and additionally at multiple elevations across the hole.

Many of Mobil's Fluid Catalytic Cracking (FCC) units are limited by the downstream gas plant. The cyclone of this invention can help debottleneck gas plants, and a variety of other atmospheric and high pressure towers. Its capacity benefits are probably highest at conditions of medium liquid flux (about 5–50 gpm/ft2 of tower area). It may retain a high capacity at conditions of even lower liquid loads and very high vapor rates, such as found in vacuum towers, although some pressure drop may occur.

DETAILED DESCRIPTION OF THE INVENTION

Figure 1:
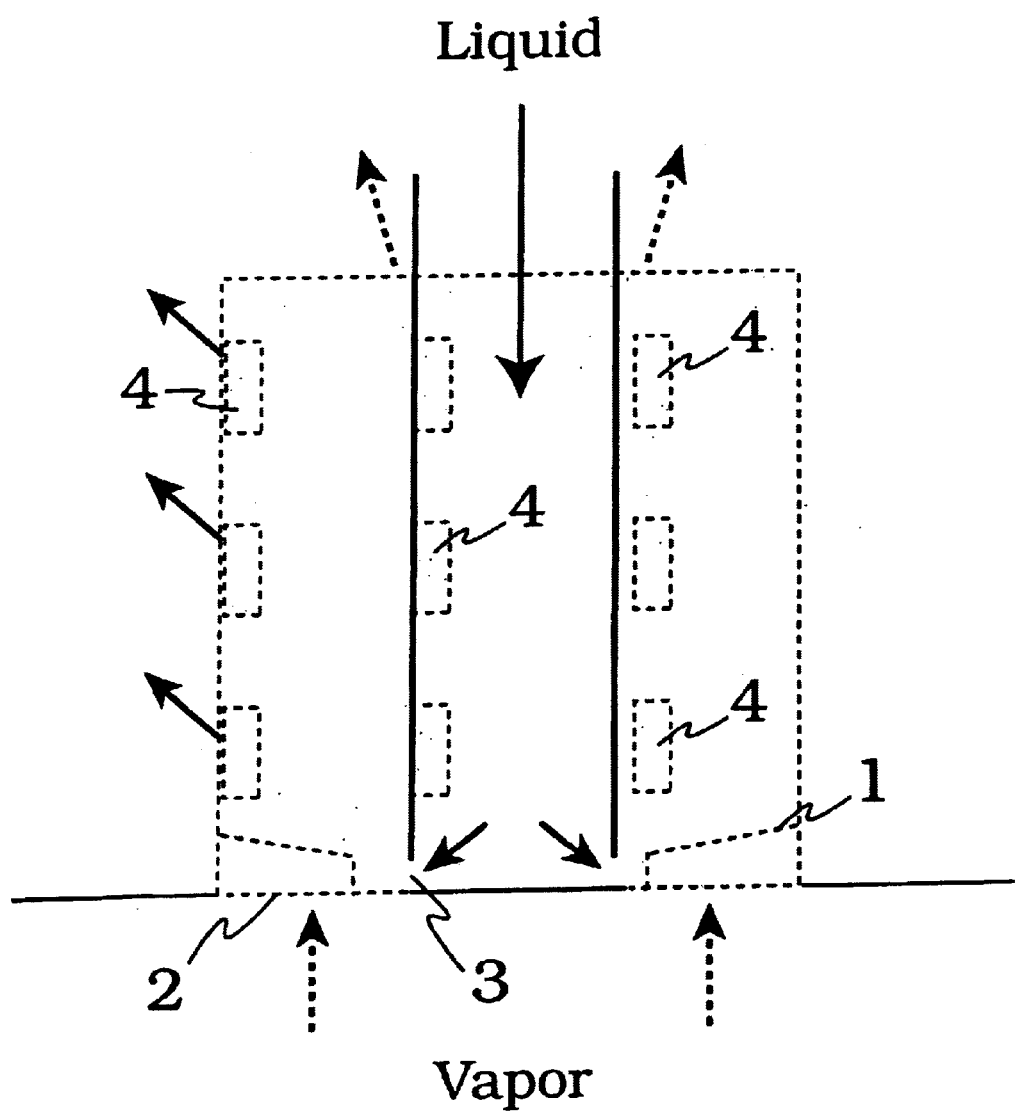
FIG. 1 illustrates a conventional cyclone design, with liquid traveling downward in a central downcomer and vapor traveling upward. The vapor and liquid initially contact each other in the vicinity of the spin vanes at the base of the cyclone.
Figure 2:
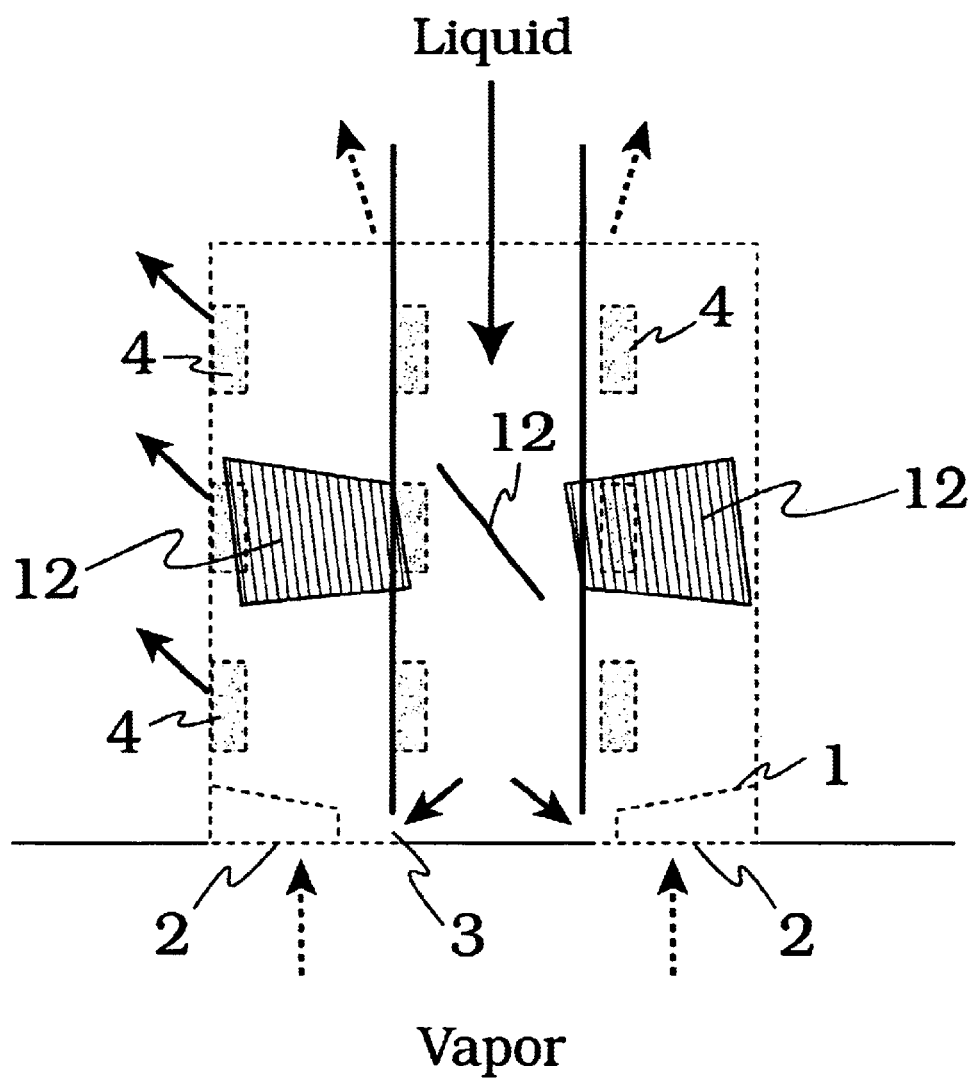
FIG. 2 shows the conventional design, augmented by the additional of secondary vanes near the mid-point of the cyclone's elevation.

The instant invention comprises an improved cyclone design as well as a process for separating liquid and vapor employing the improved cyclone design. As illustrated in FIG. 1 and described in the prior art, vanes 1 are frequently located at the cyclone inlet where liquid and vapor mix. Vapor enters through sieve holes 2. Liquid descends through the downcomer and enters contacting area of cyclone through outlet near the cyclone floor, to mix with the vapor. Vapor and entrained liquid rise in the cyclone barrel. The liquid is spun to outside wall of the cyclone barrel, where it exits through outlets 4. FIG. 2 depicts the location of secondary vanes 1. The secondary vanes of the instant invention may be located anywhere within the barrel of the cyclone. The preferred elevation is near the mid-point of the cyclone's elevation. This allows much of the liquid to exit from the lower part of the cyclone, such that the fluid which is in contact with the secondary vanes is mainly vapor, with only a minor amount of liquid.

There is no restriction on the geometry of the secondary vanes. Practically, the geometry of the vanes is chosen to provide the desired amount of spin action, while taking into consideration such aspects as minimizing pressure drop and manufacturing cost There may be more than one set of secondary vanes. There can be a single helical-shaped secondary vane. Preferably, a single set of secondary vanes is used, which occupy 5–25% of the elevation of the cyclone. If straight (uncurled) vanes are used, the preferred angle to the vertical is 30–60 degrees, more preferably 40–55 degrees, as shown in FIG. 2. Preferably, the vanes extend from the center of the barrel, or (if a central downcomer tube is used) from the surface of the downcomer tube to the wall of the cyclone or to within a distance d from the cyclone wall, where d is equal to 0.02–0.1 times the diameter of the cyclone.

The cyclone barrel may be cylindrical, conical, or any other shape, including hexagonal or octagonal, that allows vapor and liquid circulation within it. Neighboring cyclones may be close enough to touch or be further apart. Preferably, the area enclosed by the cyclones amounts to 40–85% of the total area on a given level. The cyclonic devices described may be mounted in a variety of ways in a vessel to accomplish vapor/liquid contacting. In one arrangement, the cyclone barrels are affixed to at their base to horizontal sheets, which take the form of individual trays, which are attached to the vessel walls. Circular downcomers convey liquid from one tray to the tray below, with each downcomer terminating within the barrel of a cyclone on the tray below. There is a space above each cyclone, and the weight of the tray with its cyclones is transmitted to the vessel wall via the tray.

In another arrangement, the cyclone barrel may extend upwards to the level of the horizontal sheet above, such that the weight of a sheet and its cyclones is borne primarily by the cyclones of the level below. In this arrangement, the cyclonic devices become part of a structured packing, which can have reduced fabrication and installation costs.

Figure 3:
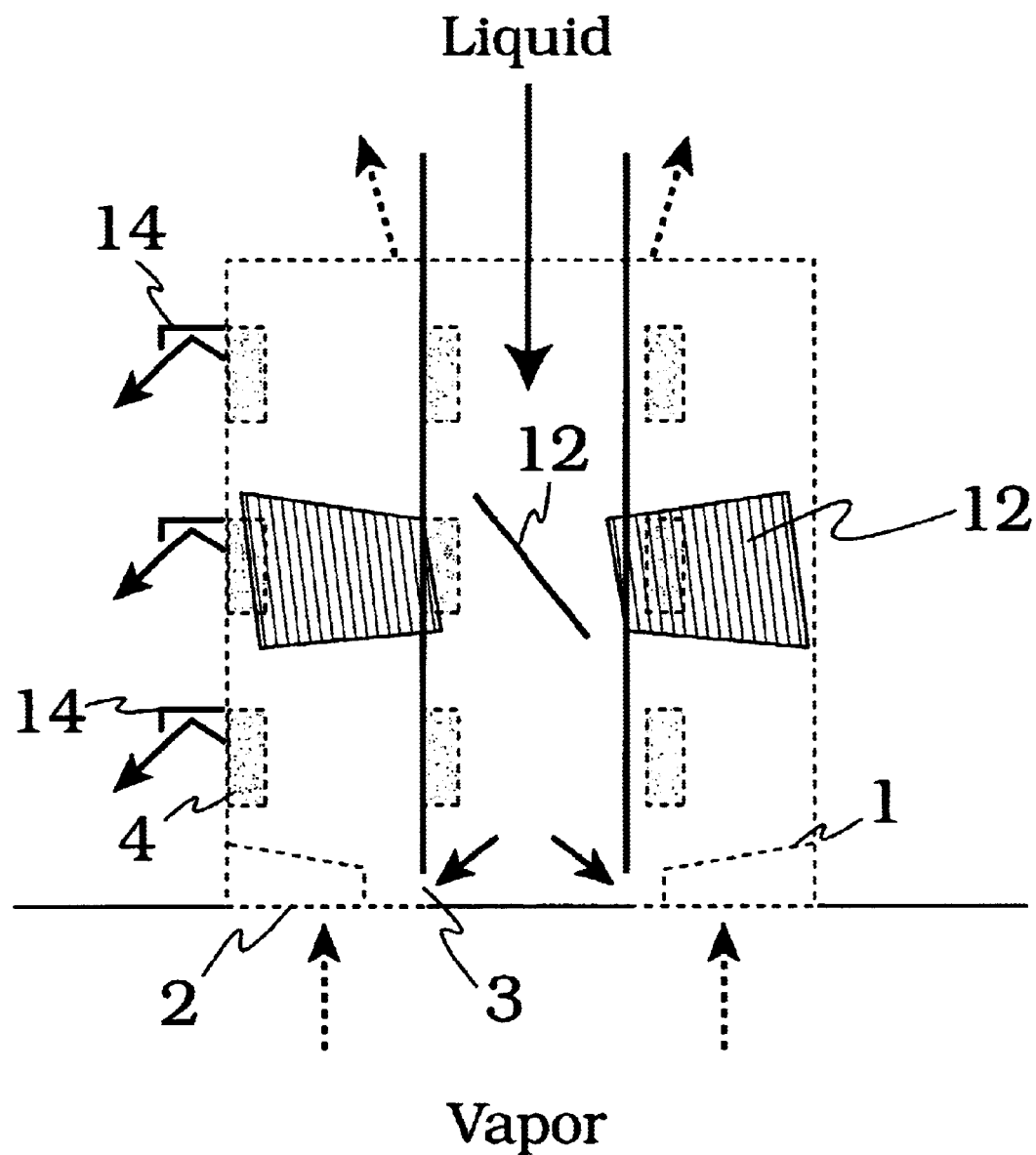
FIG. 3 shows the capping vanes, which may be installed outside the cyclone to break up the upward momentum of liquid exiting the cyclone.

As liquid exits the barrel of the cyclone of this invention, it may have appreciable upwards velocity, which can interfere with the desired liquid collection. Placing means outside the cyclone to break the upward momentum can therefore aid in liquid collection. A variety of vanes or baffles may serve as this means. FIG. 3 shows a preferred means, which is a plurality of capping vanes 1. These capping vanes may be placed along the top of an exit hole, and additionally at multiple elevations across the hole.

Figure 4:
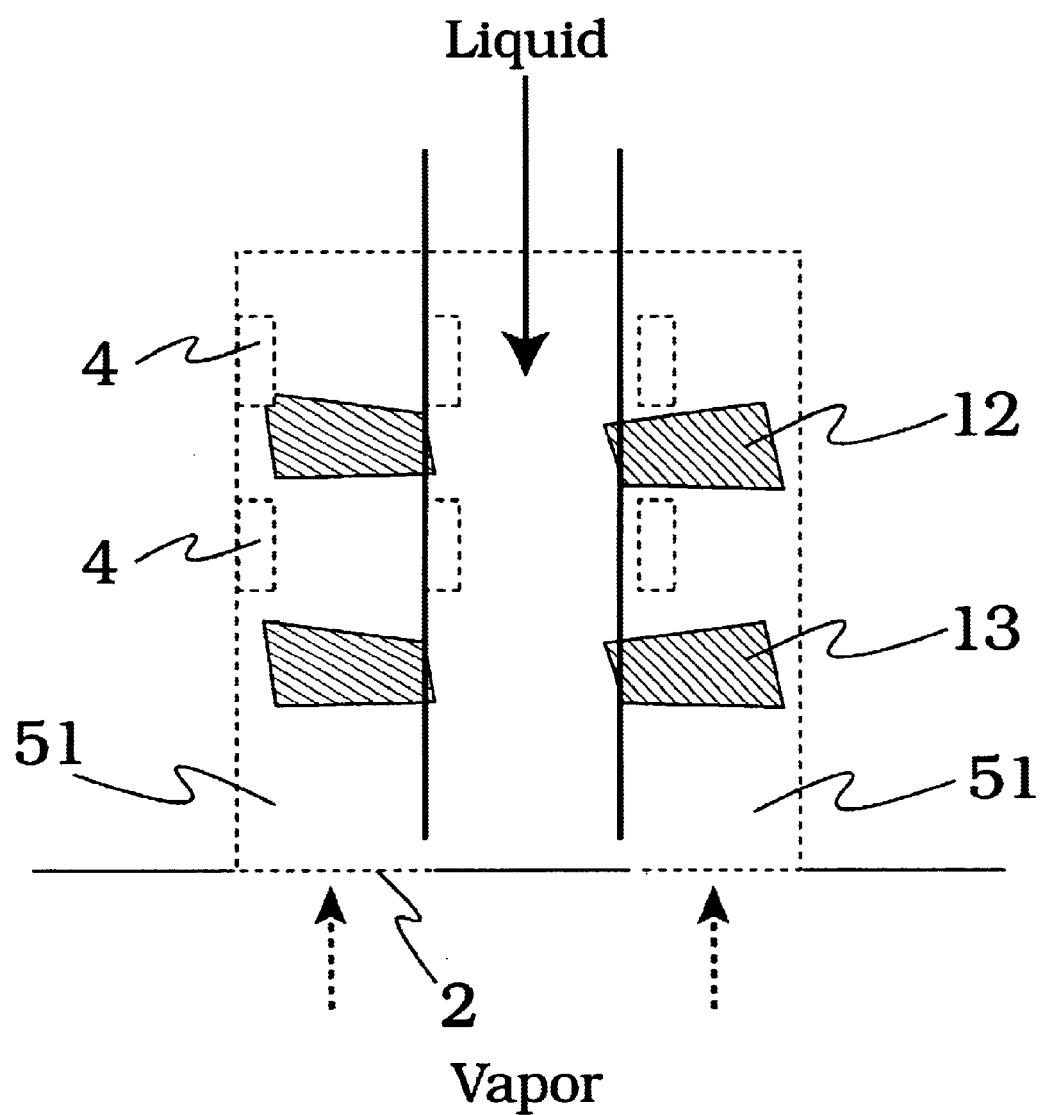
FIG. 4 illustrates a cyclone design in which there are no spin vanes at the floor of the barrel. Sieve holes are employed instead.

FIG. 4 illustrates cyclones where there are no spin vanes (a non-spinning zone) at the cyclone in let as in the case of the device in FIG. 1. The simplest case is where there are simple sieve holes in the base plate. This gives a non-spinning zone of vapor/liquid contacting at the base of the cyclone, which is 2–20 inches (preferably 3–10 inches) high. This provides excellent vapor/liquid contacting for mass transfer. There are no exit slots in the barrel in this non-spinning zone. In one variation, this zone may be packed with some sort of packing, such as structured corrugated packing, grids, random packing, or mesh, with other baffles or vanes, to promote vapor/liquid contacting.

Figure 5:
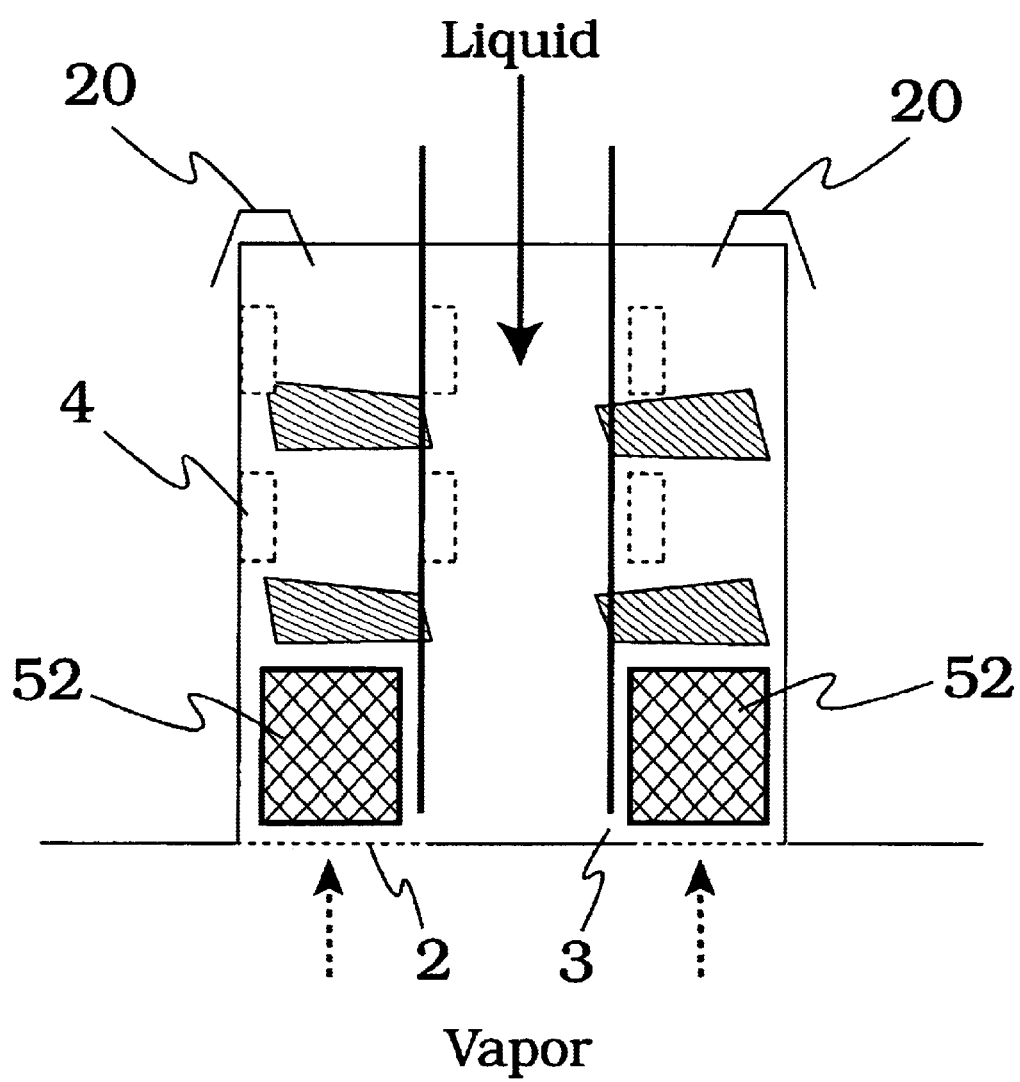
FIG. 5 illustrates the cyclone design of FIG. 4, with the additional feature of a packed non-spinning zone.

Above this non-spinning zone is a set of primary spin vanes, to impart spin to the rising vapor/liquid mixture. Above this primary set of spin vanes begin the exit slots in the barrel of the cyclone. A set of secondary spin vanes is located somewhere above the lowest opening of the exit slots. This arrangement is shown in FIG. 4. A packed non-spinning zone 1 is shown in FIG. 5. FIG. 5 also shows an annular hat 2 for liquid collection. The preferred elevation for the secondary vanes is about in the middle of the slotted section. The secondary vanes could extend for the full elevation of the slotted section of the barrel, that is, from just above the primary vanes or even appear as an upward extension of the primary vanes into the slotted section, so that there is only one elongated spin-imparting zone 1. It is notable that liquid withdrawal starts below the top of the through outlets 2 located below top of spin-imparting zone 1. It is preferred, however, to have separate, secondary vanes and it is preferred that the secondary vanes occupy only about 5–25% of the total elevation of the cyclone. As illustrated in FIG. 3, baffles such as splash caps are preferred on the outside of the barrel.

The preferred perforation pattern in the floor or base of the cyclone which is depicted in FIGS. 4 and 5 is a uniform pattern of sieve holes, with diameter 0.3–0.6 inch. However, any type of opening in the floor of the cyclone which allows vapor passage, while sized small enough to prevent massive weeping of liquid,is acceptable. These openings could be various shapes, such as slots, and have a nonuniform spatial distribution,and could have various types of hardware such as valves or vanes associated with them. These openings are preferably sized to produce a pressure drop across the base plate of 0.5 to 3.0 inches head of the process liquid.

As with the inventions of FIGS. 1–3, this arrangement of a non-spinning zone, surmounted by spin vanes and liquid exit means can apply to isolated barrels on a tray, or to cyclone barrels that are closely packed such that they are touching, and the remaining space between them defines liquid downcomers. Barrels may be circular, conical, or contain straight-sided segments. U.S. Pat. No. 5,683,493 is directed to close-packed cyclones, but without the non-spinning zone at the base and without secondary spin vanes.

What is claimed is:

1. A cyclonic device suitable for use in the contacting of vapor and liquid in a distillation or fractionation process, the cyclonic device comprising:
   (a) a floor;
   (b) a continuous side wall having an inner surface, an outer surface, an upper end and a lower end, the lower end terminating into the floor, the upper end defining an upper cyclonic region, and the side wall defining a contacting volume above the floor and below the upper cyclonic region;
   (c) at least one vapor opening in the floor for introduction of vapors into the contacting volume;
   (d) at least one liquid downcomer positioned within the continuous side wall, the downcomer having:
      (1) a side wall having an upper portion and a lower portion, the upper portion being located in the upper cyclonic region, and the lower portion extending to a point above the cyclone floor; and
      (2) at least one downcomer port located proximate to the lower portion end of the downcomer, the port defining an opening in the downcomer for introduction of liquid above the floor into the contacting volume;
   (e) a plurality of liquid outlets located on the continuous side wall;
   (f) at least two spin vanes located between the continuous side wall and the downcomer side wall, the spin vanes positioned al or above the mid-point of the continuous side wall;
   (g) a non-spinning zone located between the continuous side wall and the downcomer side wall, the non-spinning zone positioned below the midpoint of the continuous side wall and above the cyclone floor; and 2. A cyclonic device according to claim 1 which comprises (i) a primary set of spinning vanes located above the non-spinning zone and below liquid outlets located on the continuous side wall and (ii) a secondary set of spin vanes located above the liquid outlets.

3. A cyclonic device according to claim 2 which comprises liquid outlets located above the secondary set of spins vanes.

4. A series of cyclonic devices suitable for use in the contacting of vapor and liquid in a distillation or fractionation process, each device having a floor and additionally comprising:
   (a) a continuous side wall having an inner surface, an outer surface, an upper end and a lower end, the lower and terminating into the floor, the upper end defining an upper cyclonic region, and the side wall defining a contacting volume above the floor and below the upper cyclonic region,
   (b) at least one vapor opening in the floor for the introduction of vapors into the contacting volume,
   (c) at least one liquid downcomer positioned within the continuous side wall, the downcomer having:
      (1) a side wall having an upper portion and a lower portion, the upper portion being located in the upper cyclonic region, and the lower portion extending to a point above the cyclone floor, and
      (2) at least one downcomer port located proximate to the lower portion end of the downcomer, the port defining an opening in the downcomer for introduction of liquid above the floor into the contacting volume;
   (d) a plurality of liquid outlets located on the continuous side wall;
   (e) at least two spin vanes located between the continuous side wall and the downcomer side wall, the spin vanes positioned at or above the mid-point of the continuous side wall;
   (f) a non-spinning zone located between the continuous side wall and the downcomer side wall, the non-spinning zone positioned below the midpoint of the continuous side wall and above the cyclone floor.

5. A series of cyclonic devices according to claim 4 each of which comprises (i) primary set of spinning vales located above the non-spinning zone and below liquid outlets located on the continuous side wall and (ii) a secondary set of spin vanes located above the liquid outlets.

6. A series of cyclonic devices according to claim 5 in which each device comprises liquid outlets located above the secondary set of spin vanes.

* * * * *